(12) United States Patent
Lee

(10) Patent No.: US 9,146,641 B2
(45) Date of Patent: Sep. 29, 2015

(54) TOUCH DISPLAY DEVICE FOR VEHICLE AND DRIVING METHOD THEREOF

(71) Applicant: Hyundai Motor Company, Seoul (KR)

(72) Inventor: Jong Bok Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 44 days.

(21) Appl. No.: 14/095,586

(22) Filed: Dec. 3, 2013

(65) Prior Publication Data

US 2015/0029154 A1    Jan. 29, 2015

(30) Foreign Application Priority Data

Jul. 24, 2013    (KR) .................. 10-2013-0087631

(51) Int. Cl.
*G06F 3/042*      (2006.01)
*B60K 35/00*      (2006.01)
*B60K 37/02*      (2006.01)

(52) U.S. Cl.
CPC .............. *G06F 3/0425* (2013.01); *B60K 35/00* (2013.01); *B60K 37/02* (2013.01); *B60K 2350/1028* (2013.01)

(58) Field of Classification Search
CPC ................................ G06F 3/045; G06F 3/042
USPC ..................... 345/173–175; 178/18.01–18.06; 382/104
See application file for complete search history.

(56) References Cited

U.S. PATENT DOCUMENTS

| | | | |
|---|---|---|---|
| 2007/0173895 A1* | 7/2007 | Reichenbach | 607/10 |
| 2009/0081554 A1* | 3/2009 | Takada et al. | 429/322 |
| 2010/0123592 A1* | 5/2010 | Nurmi | 340/665 |
| 2010/0283740 A1* | 11/2010 | Chao | 345/173 |
| 2013/0088441 A1* | 4/2013 | Chung et al. | 345/173 |
| 2014/0098998 A1* | 4/2014 | Sharma et al. | 382/104 |

FOREIGN PATENT DOCUMENTS

| | | |
|---|---|---|
| JP | 2007-223416 A | 9/2007 |
| KR | 10-2008-0077863 | 8/2008 |
| KR | 10-2010-0098257 A | 9/2010 |
| KR | 10-2012-0100879 | 9/2012 |
| KR | 10-2013-0031050 | 3/2013 |
| KR | 10-2013-0064003 A | 6/2013 |

* cited by examiner

*Primary Examiner* — Pegeman Karimi
(74) *Attorney, Agent, or Firm* — Mintz Levin Cohn Ferris Glovsky and Popeo, P.C.; Peter F. Corless

(57) ABSTRACT

A touch display device for a vehicle and a driving method thereof are provided. The touch display device includes a touch panel that displays an image and an image irradiation unit that provides the image to the touch panel. In addition, a lighting unit radiates infrared rays to the touch panel and an image capturing unit captures an image that corresponds to a touch on the touch panel. An emergency button unit that includes at least one emergency button is activated on the touch panel during an emergency mode. A controller is configured to activate the emergency mode by sensing a failure of one of the touch panel, the image irradiation unit, the lighting unit, and the image capturing unit.

11 Claims, 4 Drawing Sheets

TOUCH DISPLAY DEVICE FOR VEHICLE AND DRIVING METHOD THEREOF

CROSS-REFERENCE TO RELATED APPLICATION

This application claims priority to and the benefit of Korean Patent Application No. 10-2013-0087631 filed in the Korean Intellectual Property Office on Jul. 24, 2013, the entire contents of which are incorporated herein by reference.

BACKGROUND (a) Field of the Invention

The present invention relates to a touch display device for a vehicle and a driving method thereof.

(b) Description of the Related Art

Recently, various input devices, such as a keypad, a jog dial, and a touch screen, have been proposed as input commands for various functions of a vehicle. Among the input devices, the touch screen is operated in a more simplified manner than the keypad or the jog dial and therefore has been applied to an audio-video-navigation (AVN) system or a cluster of a vehicle.

In general, the touch screen is implemented as a plane design (e.g., a flat or non-curved design) and therefore is difficult to apply the touch screen to a curved design within a vehicle. Further, there is a need to change a design of a display module based on the interior design of the vehicle, thereby leading to an increase in costs. Therefore, an imaging device based touch display device, which may be installed on any curved surface within the vehicle, display vehicle information on a screen, and recognize a touch of a user, has been developed. The imaging device based touch display device is disposed in a back direction of the touch screen and includes a projector that outputs an image to the touch screen, a lighting unit that radiates infrared rays, and an imaging device that captures an image when the infrared rays are reflected.

According to the touch display device, when a user touches any position on the touch screen, the infrared rays radiated from the lighting unit are reflected by the user's hand. The imaging device acquires the image on the touch screen by receiving the reflected infrared rays through an infrared filter and recognizes the touch of the user based on the acquired image.

The above information disclosed in this section is only for enhancement of understanding of the background of the invention and therefore it may contain information that does not form the prior art that is already known in this country to a person of ordinary skill in the art.

SUMMARY

The present invention provides a touch display device that may directly operate a projector or an imaging device by allowing a user to recognize emergency situations, such as a failure of the projector or the imaging device, on a touch screen, and a driving method thereof.

An exemplary embodiment of the present invention provides a touch display device for a vehicle that may include: a touch panel that displays an image; an image irradiation unit that provides the image to the touch panel; a lighting unit that radiates infrared rays to the touch panel; an image capturing unit that captures an image that corresponds to a touch on the touch panel; an emergency button unit including at least one emergency button which is activated on the touch panel during an emergency mode; and a controller that activates the emergency mode by sensing a failure of at least one of the touch panel, the image irradiation unit, the lighting unit, and the image capturing unit.

The emergency button may be formed in an area other than a display area in which the image of the touch panel is displayed. The emergency button may include: a light emitting unit that emits light during the emergency mode; and a sensor unit that senses a touch on the emergency button. The sensor unit may include: a light emitting sensor that irradiates infrared light; and a light receiving sensor that generates a sensing signal by receiving the infrared light reflected by the touch. The controller may turn on/off or reset a power supply for at least one of the touch panel, the image irradiation unit, the lighting unit, and the image capturing unit depending on the sensing signal. The touch panel may have a curved surface.

Another exemplary embodiment of the present invention provides a driving method of a touch display device for a vehicle including a touch panel that displays an image, an image irradiation unit that provides the image to the touch panel, a lighting unit that radiates infrared rays to the touch panel, an image capturing unit that captures an image that corresponds to a touch on the touch panel, and an emergency button unit that includes at least one emergency button disposed on the touch panel, the driving method may include: activating, by a controller, an emergency mode by sensing a failure of at least one of the touch panel, the image irradiation unit, the lighting unit, and the image capturing unit; light-emitting the emergency button; sensing a touch on the emergency button; and operating, by the controller, at least one of the touch panel, the image irradiation unit, the lighting unit, and the image capturing unit.

The sensing of the touch may include: irradiating infrared rays; and generating a sensing signal by receiving the infrared light reflected by the touch. The operating of the plurality of units may include turning on/off or resetting a power supply for at least one of the touch panel, the image irradiation unit, the lighting unit, and the image capturing unit depending on the sensing signal.

Figure 1:
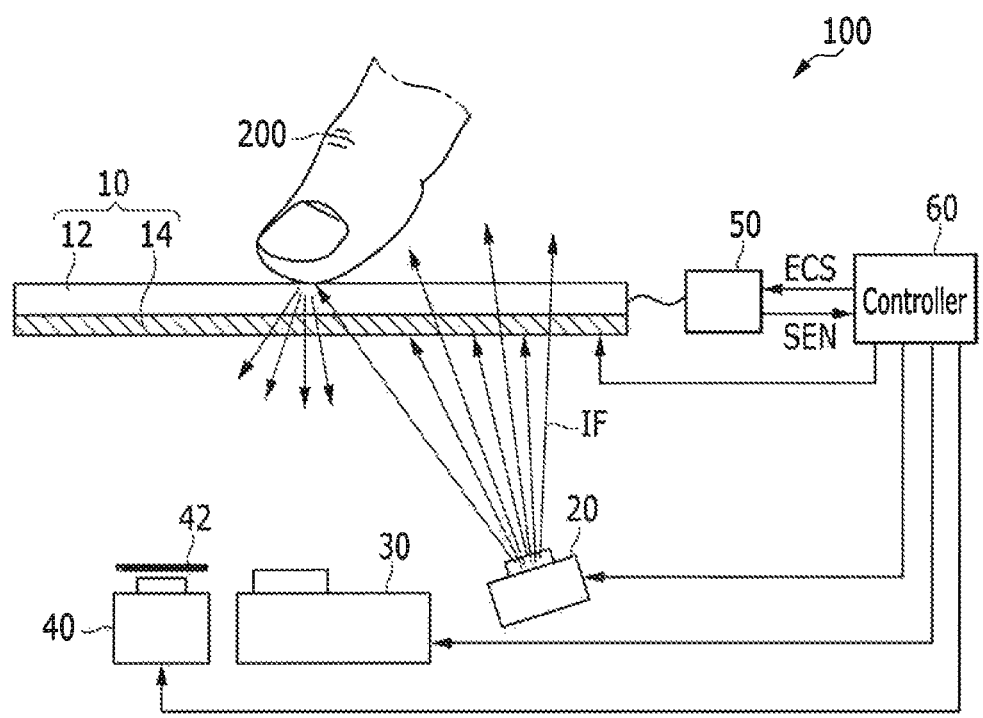
FIG. 1 is an exemplary diagram illustrating a touch display device according to an exemplary embodiment of the present invention.

| Description of symbols | |
|---|---|
| 10: Touch panel | 20: Lighting unit |
| 30: Image irradiation unit | 40: Image capturing unit |
| 50: Emergency button unit | 60: Controller |

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
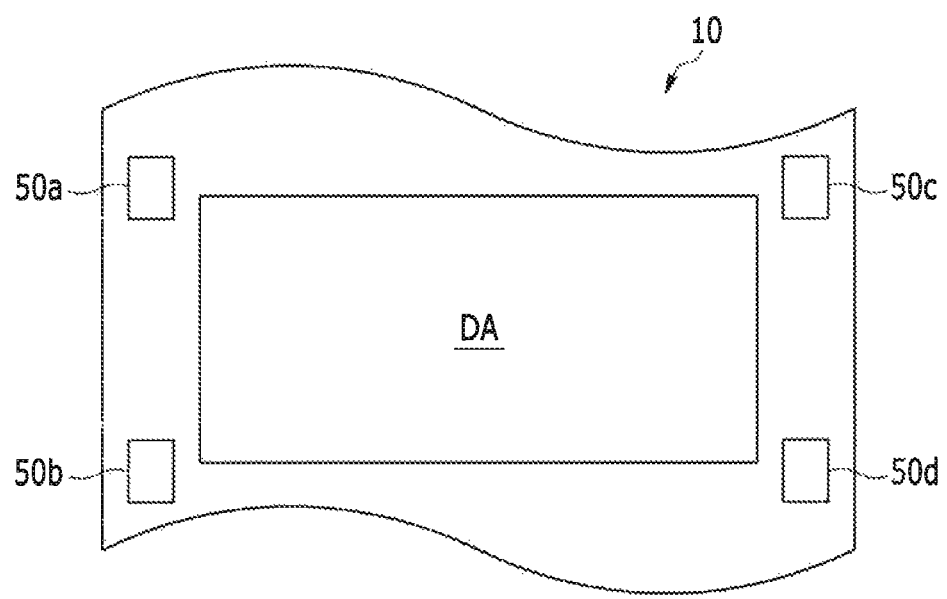
FIG. 2 is an exemplary diagram schematically illustrating a touch panel illustrated in FIG. 1 according to an exemplary embodiment of the present invention.

FIG. 1 is an exemplary diagram illustrating a touch display device according to an exemplary embodiment of the present invention and FIG. 2 is an exemplary diagram schematically illustrating a touch panel 10 illustrated in FIG. 1.

Referring to FIG. 1, a touch display device 100 according to the exemplary embodiment of the present invention may include a touch panel 10, a lighting unit 20, an image irradiation unit 30, an image capturing unit 40, an emergency button unit 50, and a controller 60. The controller 60 may be configured to operate the touch panel 10, the lighting unit 20, the image irradiation unit 30, the image capturing unit 40, and the emergency button unit 50.

In this configuration, the touch panel 10 may include a substrate 12 touched by a user 200 and a diffusion film 14 disposed on a back surface of the substrate 12. The substrate 12 may be formed to correspond to a curved surface within a vehicle. For example, the substrate 12 may be formed in an AVN, a cluster, a dash board, and the like, within the vehicle. Further, the substrate 12 may be formed of a transparent material, for example, an acryl plate which may transmit infrared light and have an image focused thereon. The diffusion film 14 may diffuse an image emitted from the image irradiation unit 30.

The lighting unit 20 may be configured to radiate infrared rays (IF) to the touch panel 10. In this configuration, the lighting unit 20 may include an infrared lighting module. The image irradiation unit 30 may be configured to provide an image to the touch panel 10. Further, the image irradiation unit 30 may include a projector module and may be configured to reflect an image using an aspherical reflection mirror (not illustrated) to irradiate an image to the touch panel 10.

The image capturing unit 40 may be configured to capture the image of the touch panel 10. In particular, the image capturing unit 40 may include an infrared imaging device configured to obtain (e.g., acquire) an image by sensing infrared rays, which are reflected by a touch of a user, among infrared rays (IF) transmitting the touch panel 10. Further, the image capturing unit 40 may include an infrared filter 42 which may selectively filter the infrared rays.

The emergency button unit 50 may include a plurality of emergency buttons 50a to 50d activated based on an emergency control signal (ECS) on the touch panel 10 to emit light. Each of the plurality of emergency buttons 50a to 50d may be configured to sense an approach of a user's hand to generate a sensing signal (SEN). In particular, the plurality of emergency buttons 50a to 50d may be disposed in an area other than a display area (DA) in which an image is displayed on the touch panel 10. For example, as illustrated in FIG. 2, the plurality of emergency buttons 50a to 50d may be disposed in any button area of an edge area of the touch panel 10. Each of the plurality of emergency buttons 50a to 50d may be vertically disposed in left and right areas of the edge area of the touch panel 10.

Moreover, each of the plurality of emergency buttons 50a to 50d may correspond to a function of turning on/off or resetting a power supply for the image irradiation unit 30 or the image capturing unit 40. The exemplary embodiment of the present invention is not limited thereto, but each of the plurality of emergency buttons 50a to 50d may correspond to a function of turning on/off a power supply for the AVN, an air conditioner, and the touch panel 10. Further, the exemplary embodiment of the present invention may correspond to any one of setting modes for a control system within a vehicle, depending on the number of a plurality of emergency buttons 50a to 50d which is selected by the user or a selected order.

The controller 60 may be configured to operate the touch panel 10, the lighting unit 20, the image irradiation unit 30, the image capturing unit 40, and the emergency button unit 50. In particular, the controller 60 may be configured to operate the touch panel 10, the lighting unit 20, the image irradiation unit 30, and the image capturing unit 40 during a normal mode (e.g., when an emergency is not sensed) to display an image on the touch panel 10 and may be configured to recognize the touch of the user (e.g., pressure on the touch panel 10) to perform an operation of the various units.

Furthermore, the controller 60 may be configured to determine whether one of the touch panel 10, the lighting unit 20, the image irradiation unit 30, and the image capturing unit 40 is broken (e.g., has failed) and may be configured to convert the normal mode into an emergency mode when the failure occurs. The controller 60 may be configured to generate the emergency control signal ECS during the emergency mode and may be configured to transfer the generated emergency control signal ECS to the emergency button unit 50.

Additionally, the controller 60 may be configured to receive the sensing signal SEN from the emergency button unit 50 and operate the touch panel 10, the lighting unit 20, the image irradiation unit 30, and the image capturing unit 40 based on the sensing signal SEN. For example, when the user selects the emergency button, which turns off the image irradiation unit 30, among the plurality of emergency buttons 50a to 50d, the controller 60 may be configured to forcibly turn off the image irradiation unit 30.

The exemplary embodiment of the present invention is not limited thereto, but the controller 60 may be configured to display messages, words, or letters (e.g., characters) on the plurality of emergency buttons 50a to 50d through the image irradiation unit 30 during the emergency mode. For example, 'turn off the power supply', 'reset', and the like may be displayed on the emergency button unit 50. Further, the controller 60 may be configured to operate an emission frequency and a color of each of the plurality of emergency buttons 50a to 50d.

Figure 3:
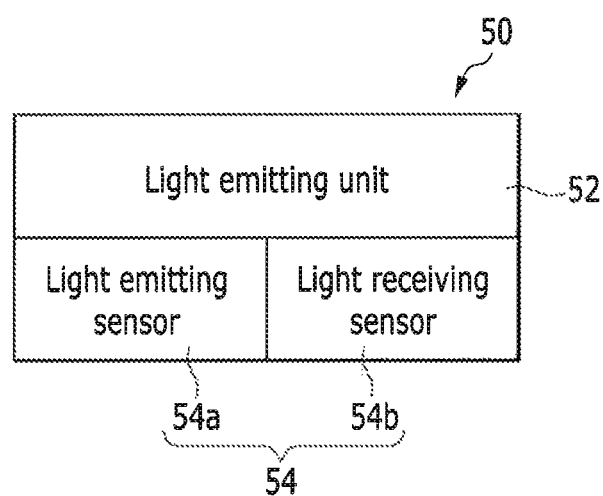
FIG. 3 is an exemplary diagram illustrating an emergency button unit of FIG. 1 according to an exemplary embodiment of the present invention.

FIG. 3 is an exemplary diagram illustrating the emergency button unit 50 of FIG. 1. Referring to FIG. 3, the emergency button unit 50 may include a light emitting unit 52 and a sensor unit 54. In this configuration, the light emitting unit 52 may be configured to selectively emit light based on the emergency control signal ECS. The light emitting unit 52 may include a light emitting device, for example, a light emitting diode (LED). In particular, the light emitting unit 52 may include one of red, green, and blue light emitting diodes.

The sensor unit 54 may be configured to irradiate the infrared light to the button area and sense the infrared light reflected by the user's hand to generate the sensing signal SEN. In this configuration, the sensor unit 54 may include a light emitting sensor 54a that emits the infrared light and a light receiving sensor 54b that receives the infrared light, based on the emergency control signal ECS. The exemplary embodiment of the present invention is not limited thereto, but various sensors that may sense the user's hand by a contactless method may be used. Further, instead of the light emitting sensor 54a, the lighting unit 20 may also be used.

Figure 4:
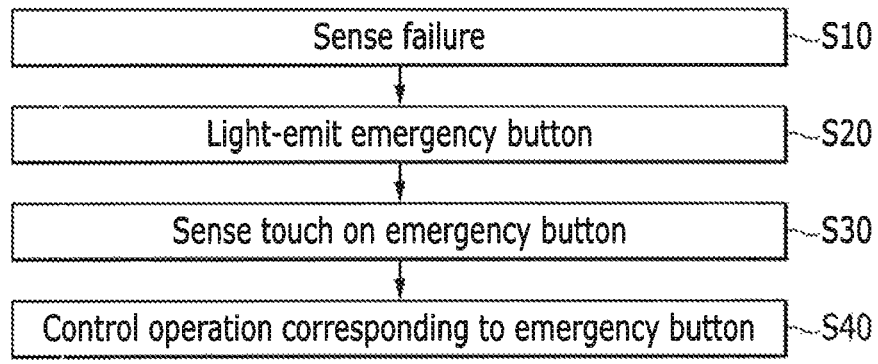
FIG. 4 is an exemplary flowchart of a driving method of a touch display device according to an exemplary embodiment of the present invention.

Hereinafter, a driving method according to an exemplary embodiment of the present invention will be described. FIG. 4 is an exemplary flowchart of a driving method of a touch display device according to an exemplary embodiment of the present invention.

Referring to FIG. 4, the controller 60 may be configured to sense (e.g., determine) a failure of one of the touch panel 10, the lighting unit 20, the image irradiation unit 30, and the image capturing unit 40 (S10). Then, the controller 60 may be configured to convert the normal mode into the emergency mode to generate the emergency control signal ECS and transfer the emergency control signal ECS to the light emitting unit 52.

The light emitting unit 52 may be configured to emit light based on the emergency control signal ECS (S20). At the same time, the light emitting sensor 54a may be configured to emit the infrared light. Then, when the failure of the display device 100 is recognized, one of the plurality of emergency buttons 50a to 50d may be manipulated (S30). For example, when an object (e.g., a user's finger) approaches (e.g., hovers over or applies pressure to) the emergency button 50a, the light receiving sensor 54b may be configured to receive the infrared light reflected by the object. The controller 60 may be configured to determine a position of the emergency button 50a selected based on the sensing signal and may be configured to perform the control operation that corresponds to the corresponding emergency button 50a (S40). The controller 60 may be configured to turn on/off or reset a power supply for at least one of the image irradiation unit and the image capturing unit.

According to the exemplary embodiment of the present invention, when the operation error of the imaging device based touch display device occurs, the controller may be configured to convert the normal mode into the emergency mode to directly control the turn on/off, the reset, or the like of the touch display device on the touch screen during the emergency mode.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:

1. A touch display device for a vehicle, comprising:
   a to panel configured to display an image;
   an image irradiation unit configured to provide the image to the touch panel;
   a lighting unit configured to radiate infrared rays to the touch panel;
   an image capturing unit configured to capture the image that corresponds to a touch on the touch panel;
   an emergency button unit including at least one emergency button which is activated on the touch panel during an emergency mode; and
   a controller configured to activate the emergency mode by sensing a failure of at least one of the touch panel, the image irradiation unit, the lighting unit, and the image capturing unit,
   wherein the emergency button unit includes:
   a light emitting unit configured to emit light during the emergency mode; and
   a sensor unit configured to sense a touch on the emergency button.

2. The touch display device for a vehicle of claim 1, wherein the emergency button is formed in an area other than a display area in which the image of the touch panel is displayed.

3. The touch display device for a vehicle of claim 1, wherein the sensor unit includes:
   a light emitting sensor configured to irradiate infrared light; and
   a light receiving sensor configured to generate a sensing signal by receiving the infrared light reflected by the touch.

4. The touch display device for a vehicle of claim 3, wherein the controller is configured to:
   turn on/off or reset a power supply for one of the touch panel, the image irradiation unit, the lighting unit, and the image capturing unit based on the sensing signal.

5. The touch display device for a vehicle of claim 1, wherein the touch panel includes a curved surface.

6. A driving method of a touch display device for a vehicle, comprising:
   activating, by a controller, an emergency mode by sensing a failure of one of a touch panel, an image irradiation unit, a lighting unit, and an image capturing unit;
   illuminating, by the controller, an emergency button unit;
   sensing, by the controller, a touch on the emergency button unit; and operating, by the controller, one of the touch panel, the image irradiation unit, the lighting unit, and the image capturing unit,
wherein the touch panel is configured to display an image,
wherein the image irradiation unit is configured to provide the image to the touch panel,
wherein the lighting unit is configured to radiate infrared rays to the touch panel,
wherein the image capturing unit is configured to capture the image that corresponds to the touch on the touch panel, and
wherein the emergency button unit includes at least one emergency button disposed on the touch panel.

7. The driving method of claim 6, wherein sensing the touch includes:
irradiating, by the controller, infrared rays; and
generating, by the controller, a sensing signal by receiving the infrared light reflected by the touch.

8. The driving method of claim 7, wherein the operation of the units includes:
turning on/off or resetting, by the controller, a power supply for one of the touch panel, the image irradiation unit, the lighting unit, and the image capturing unit based on the sensing signal.

9. A non-transitory computer readable medium containing program instructions executed by a controller, the computer readable medium comprising:
program instructions that control a touch panel to display an image;
program instructions that control an image irradiation unit to provide the image to the touch panel;
program instructions that a lighting unit to radiate infrared rays to the touch panel;
program instructions that an image capturing unit to capture the image that corresponds to the touch on the touch panel;
program instructions that activate an emergency mode by sensing a failure of one of the touch panel, the image irradiation unit, the lighting unit, and the image capturing unit;
program instructions that illuminate an emergency button unit that includes at least one emergency button disposed on the touch panel;
program instructions that sense a touch on the emergency button unit; and
program instructions that operate one of the touch panel, the image irradiation unit, the lighting unit, and the image capturing unit.

10. The non-transitory computer readable medium of claim 9, further comprising:
program instructions that irradiate infrared rays; and
program instructions that generate a sensing signal by receiving the infrared light' reflected by the touch.

11. The non-transitory computer readable medium of claim 10, further comprising:
program instructions that turn on/off or reset a power supply for one of the touch panel, the image irradiation unit, the lighting unit, and the image capturing unit based on the sensing signal.

* * * * *